(No Model.)  2 Sheets—Sheet 1.
F. MOORE.
ORCHARD OR VINEYARD PLOW.
No. 591,676. Patented Oct. 12, 1897.
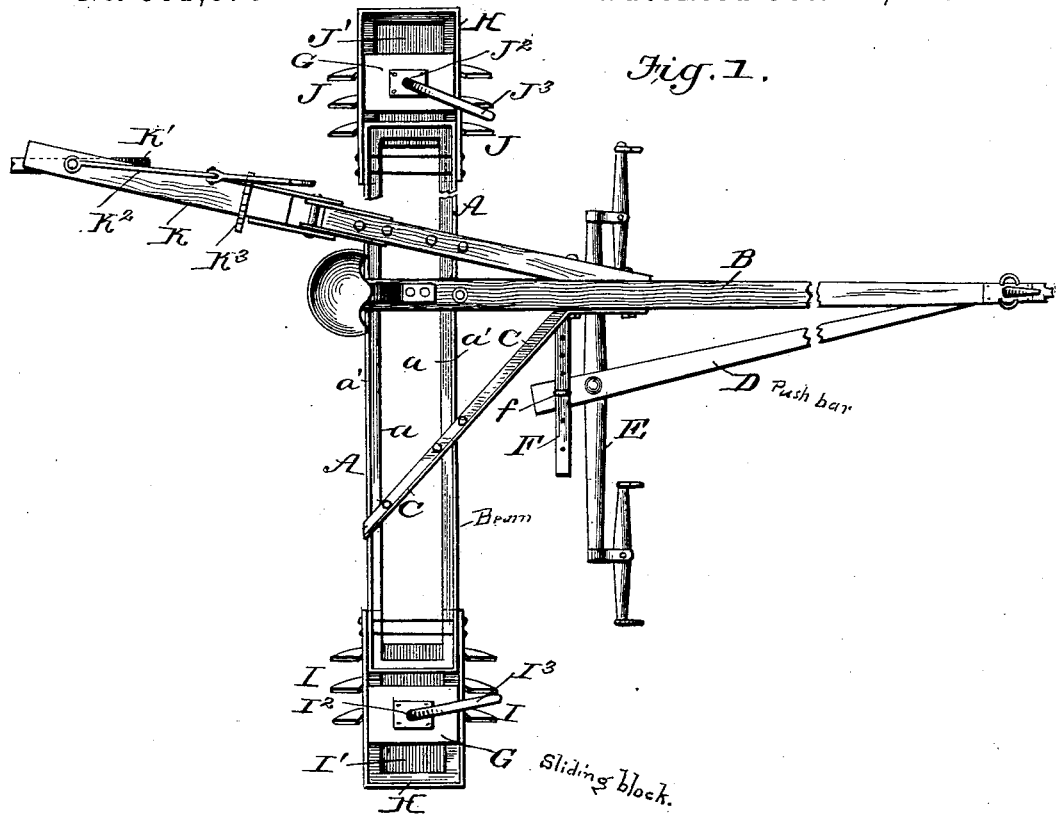
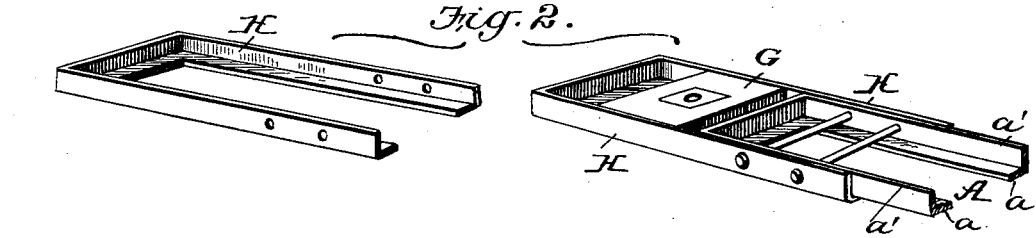
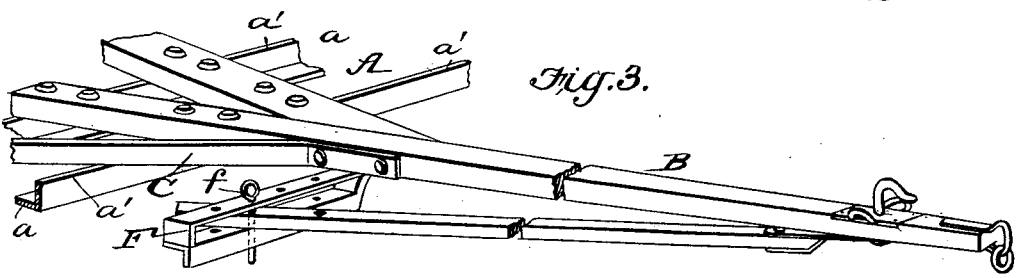
WITNESSES: M. D. Blondel, P. B. Turpin
INVENTOR Felix Moore.
BY Munn & Co.
ATTORNEYS.

(No Model.) 2 Sheets—Sheet 2.
F. MOORE.
ORCHARD OR VINEYARD PLOW.

No. 591,676. Patented Oct. 12, 1897.

WITNESSES:
M. S. Blondel.
P. B. Turpin.

INVENTOR
Felix Moore.
BY Munn & Co.
ATTORNEYS.

UNITED STATES PATENT OFFICE.

FELIX MOORE, OF HANFORD, CALIFORNIA.

ORCHARD OR VINEYARD PLOW.

SPECIFICATION forming part of Letters Patent No. 591,676, dated October 12, 1897.

Application filed May 15, 1897. Serial No. 636,694. (No model.)

*To all whom it may concern:*

Be it known that I, FELIX MOORE, of Hanford, in the county of Kings and State of California, have invented a new and useful Improvement in Orchard or Vineyard Plows, of which the following is a specification.

My invention is an improvement in plows, and particularly in those plows designed for use in orchards and vineyards; and the invention consists in certain novel constructions and combinations of parts, as will be hereinafter described, and pointed out in the claims.

Figure 4:
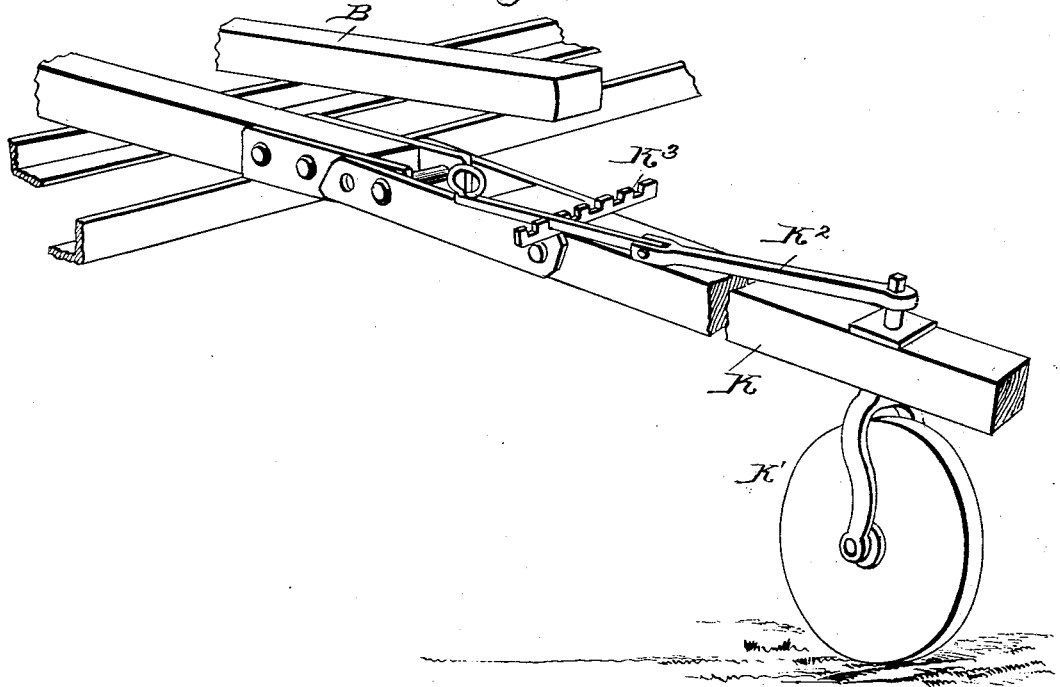
Figure 5:
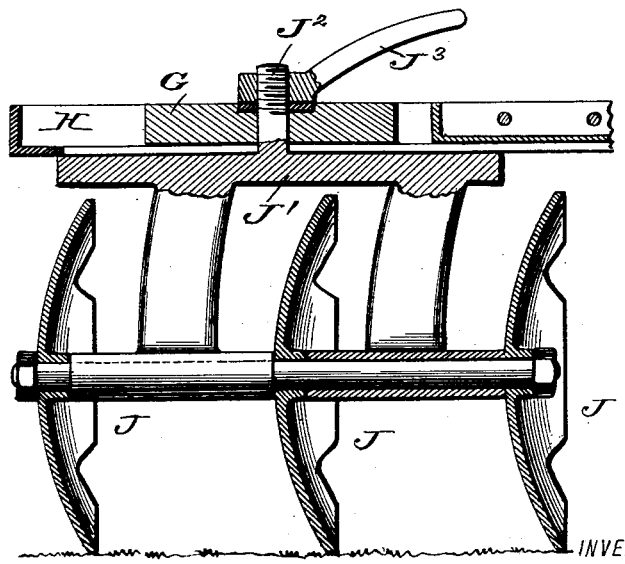

In the drawings, Figure 1 is a top plan view of my plow. Fig. 2 is a detail view of the extension-frame. Fig. 3 is a detail view illustrating the push-bar. Fig. 4 is a detail view illustrating the tiller-wheel, and Fig. 5 shows the tail-nut device for securing the plows in different positions.

The plow has a cross or main beam A, fixed to the tongue B and braced, if desired, by beam C, the beams C and B constituting the main frame of the plow.

To prevent side draft when the plows are arranged at different distances from the pole, I provide what I call the "push-bar" D. This bar D is jointed at its front end to the pole near the front end of the latter, supports the whiffletree E at a point near its rear end, and is adjustable laterally at such end toward and from the pole and may be held in any adjustment by a detent-pin $f$, which secures the push-bar to a frame F, in which such bar slides. This frame F forms with the pole and push-bar a triangle, and the push-bar may be adjusted at its rear end in or out to suit the adjustments of the plow and to push the pole to right or left and to overcome side draft.

The beam A is shown as formed of angle iron or steel, having an upright flange $a'$ and a base-flange $a$, the latter supporting the sliding block G, which is utilized in securing the plows. An extension-frame H is provided, which may be readily secured to or removed from the beam A and permits the extension of said beam to form an orchard-plow. When the extension-frame is removed, the plow is adapted for vineyard or field purposes.

The plows I I and J J have head-blocks I' and J', lapping under the beam A, and threaded shanks $I^2 J^2$, which extend up through the beam and the sliding blocks G, sliding therein, and receive the tail-nuts $I^3 J^3$, which serve to hold the plows in any position to which they may be adjusted in or out or to set the plows for an outthrow or an inthrow, as may be desired. I provide a tiller comprising a beam K, pivoted to the main frame, so it can be adjusted up or down, and provided with the tiller-wheel K', adjustable by means of lever $K^2$ and rack $K^3$, so it can be set to steady the end of the pole when the team is walking.

The angle iron or steel extension-frame can be attached or detached by manipulating four bolts, and so readily convert the implement into an orchard or a vineyard plow, as may be desired.

In use the implement may be adjusted to plow four feet outside of the team without any side draft, enabling orchardists to plow right underneath their trees while the horses are walking four feet away from same. Consequently none of the limbs of the tree are broken or injured by the horses, nor are any blossoms or fruit knocked off. When plowing in vineyards, the implement can be set to walk the team in the center of the rows and plow out the whole land, or it can be set to straddle the rows.

The push-pole can be worked from above or beneath the pole, as will be readily understood.

Having thus described my invention, what I claim as new, and desire to secure by Letters Patent, is—

1. A plow substantially as described comprising the frame the tongue, a push-bar connected at its front end with the tongue and adjustable laterally at its rear end, and the plows proper adjustable laterally on the frame substantially as described.

2. In a plow the frame having a cross-beam and an extension-section arranged to be rigidly attached thereto and the plows proper adapted to be adjustably supported either on the cross-beam or the extension-section thereof substantially as described.

3. A plow comprising a cross-beam of angle metal, an extension-frame of similar metal, fastenings by which to detachably connect the cross-bars and extension, a block fitted to slide in the cross-frame or its extension the plows and means by which the same may be held to the sliding block substantially as described.

4. In a plow a beam of angle metal combined with a block fitting therein, the plows proper having a head-block and the clamp connecting the same with the sliding block substantially as described.

5. A plow comprising the pole the cross-beam having the extension-section, the plows proper carried by said beam, the push-bar jointed at its front end to the pole and adjustable laterally at its rear end and means by which to secure the said push-bar in any adjustment, the draft being applied to said push-bar substantially as described.

6. The combinntion in a plow, of the frame, the block adjustable in said frame, and the plows proper having a head-block adjustably connected with the first-named block substantially as described.

7. The combination with the cross-beam of angle metal, an extension-section of similar metal, and fastenings by which to detachably connect the cross-bars and extension-section; of a block adjustable in the cross-beam and extension-section, plows proper having a head-block, and a clamp adjustably connecting said head-block with the first-named block, substantially as described.

8. The plow herein described consisting of the cross-beam, the pole, the push-bar, the whiffletree connected with the push-bar, the rudder-wheel and its support, the extension-frame connected with the beam, the block fitted to slide therein and the plows proper connected with said block substantially as described.

FELIX MOORE.

Witnesses:
 FRANK W. ISAAC,
 WALTER B. BARNES.